United States Patent
Shukla et al.

(10) Patent No.: US 11,966,765 B2
(45) Date of Patent: Apr. 23, 2024

(54) MEMORY BANDWIDTH THROTTLING FOR VIRTUAL MACHINES

(71) Applicant: NVIDIA Corporation, Santa Clara, CA (US)

(72) Inventors: Santosh Kumar Ravindranath Shukla, Maharashtra (IN); Andrew Currid, Alameda, CA (US); Chenghuan Jia, Fremont, CA (US); Arpit R. Jain, Maharashtra (IN); Shounak Santosh Deshpande, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 559 days.

(21) Appl. No.: 17/015,377

(22) Filed: Sep. 9, 2020

(65) Prior Publication Data

US 2022/0075638 A1    Mar. 10, 2022

(51) Int. Cl.
*G06F 9/455* (2018.01)
*G06N 3/04* (2023.01)
(Continued)

(52) U.S. Cl.
CPC .......... *G06F 9/45558* (2013.01); *G06N 3/04* (2013.01); *G06N 3/08* (2013.01); *A63F 13/30* (2014.09); *G06F 2009/45583* (2013.01)

(58) Field of Classification Search
CPC ....... G06F 9/45558; G06F 2009/45583; G06F 2201/81; G06F 11/301; G06F 11/3419;
(Continued)

(56) References Cited

U.S. PATENT DOCUMENTS

2012/0011499 A1   1/2012  Conover et al.
2012/0096458 A1   4/2012  Huang et al.
(Continued)

OTHER PUBLICATIONS

Wei, Jing, et al., "Performance Isolation for Mixed Criticality Real-time System on Multicore with Xen Hypervisor," Jan. 31, 2013, pp. 1-57, retrieved from: http://web.archive.org/web/20170814194141if_http://www.diva-portal.org/smash/get/diva2:603227/FULLTEXT01.pdf.
(Continued)

*Primary Examiner* — Kenneth Tang
(74) *Attorney, Agent, or Firm* — Leydig, Voit & Mayer, Ltd.

(57) ABSTRACT

Systems and methods are disclosed for throttling memory bandwidth accessed by virtual machines (VMs). A technique for dynamically throttling the virtual computer processing units (vCPUs) assigned to a VM (tenant) controls the memory access rate of the VM. When the memory is shared by multiple VMs in a cloud-computing environment, one VM increasing its memory access rate may cause another VM to suffer memory access starvation. This behavior violates the principle of VM isolation in cloud computing. In contrast to conventional systems, a software solution for dynamically throttling the vCPUs may be implemented within a hypervisor and is therefore portable across CPU families and doesn't require specialized server-class CPU capabilities or limit the system configuration.

19 Claims, 12 Drawing Sheets

(51) Int. Cl.
*G06N 3/08* (2023.01)
*A63F 13/30* (2014.01)

(58) Field of Classification Search
CPC ............. G06F 11/3433; G06F 11/3466; G06F 2009/45579; G06F 2009/45587; G06N 3/04; G06N 3/08; A63F 13/30
See application file for complete search history.

(56) References Cited

U.S. PATENT DOCUMENTS

| | | | |
|---|---|---|---|
| 2014/0282529 | A1 | 9/2014 | Bugenhagen |
| 2018/0088804 | A1* | 3/2018 | Mummidi ............... G06F 3/067 |
| 2019/0042434 | A1* | 2/2019 | Gough .................... H04L 49/70 |
| 2021/0064405 | A1* | 3/2021 | Ashkar ............... G06F 9/45558 |
| 2021/0263779 | A1* | 8/2021 | Haghighat ............ G06F 9/5061 |
| 2021/0287327 | A1* | 9/2021 | Appu ........................ G06T 1/60 |
| 2021/0373930 | A1* | 12/2021 | Xu ...................... G06F 9/45558 |

OTHER PUBLICATIONS

International Search Report, dated Dec. 21, 2021, in International Patent Application No. PCT/US2021/049263.

* cited by examiner

MEMORY BANDWIDTH THROTTLING FOR VIRTUAL MACHINES

BACKGROUND

In cloud computing, virtual machines (VMs) share server resources, including central processing unit (CPU) cores, storage devices, I/O devices, GPU and system memory. Basic tenets of multi-tenancy in cloud computing is efficient resource utilization, and providing each VM (tenant) isolation from neighbors. However, when the system memory is shared by multiple VMs in a cloud-computing environment, one VM increasing its memory access rate may cause another VM to suffer memory access starvation. This behavior undermines the principle of VM isolation in cloud computing.

Some (physical) CPU hardware implementations enable allocation of memory access bandwidth at the individual CPU core level. Hardware-based counters used for monitoring and hardware-based throttling techniques operate at the level of physical CPU cores. However, many CPUs, particularly less expensive CPUs, do not have sufficient memory access bandwidth allocation capability. In general, a CPU has no information about which virtual computer processing unit (vCPU) belonging to one of the VMs is running a task on the CPU. It is possible to configure VMs and vCPUs such that a given CPU core executes tasks scheduled for a single given vCPU. In this manner, it is possible to establish correlation between HW counters and vCPU behavior. However, constraining the system to require each CPU core to be limited for use by the vCPU(s) assigned to a single VM may be too restrictive. There is a need for addressing these issues and/or other issues associated with the prior art.

SUMMARY

Embodiments of the present disclosure relate to memory bandwidth throttling for virtual machines. Systems and methods are disclosed that dynamically throttle the vCPUs assigned to a virtual machine (tenant) to control the memory access rate of the VM. When the memory is shared by multiple VMs in a cloud-computing environment, one VM increasing its memory access rate may cause another VM to suffer memory access starvation. In contrast to conventional systems, a software solution for dynamically throttling the vCPUs may be implemented within a hypervisor and is therefore portable across CPU families and doesn't require specialized server-class CPU capabilities or limit the system configuration.

BRIEF DESCRIPTION OF THE DRAWINGS

The present systems and methods for throttling memory bandwidth of virtual machines are described in detail below with reference to the attached drawing figures, wherein.

DETAILED DESCRIPTION

Systems and methods are disclosed for dynamically throttling or rate-limiting vCPUs assigned to a virtual machine (tenant) in multi-tenant systems to control the memory access rate of each VM. Dynamic throttling is performed in software to adaptively reduce memory access starvation of one or more VMs in a cloud-computing environment and preserve the principle of VM isolation for shared resources. In an embodiment, a software solution for dynamically throttling the vCPUs is implemented within a hypervisor and is therefore portable across CPU families and doesn't require specialized server-class CPU capabilities or limit the system configuration. A scheduler within the hypervisor allocates timeslices to the vCPUs for processing. When performance data (e.g., measured performance values) according to a memory access metric for a vCPU exceeds a threshold value, the scheduler throttles the vCPU memory access bandwidth by forcing the vCPU to be idle for at least a portion of each timeslice or for an entirety of at least one of the timeslices. When the performance data according to the memory access metric no longer exceeds the threshold value, the scheduler ceases throttling for the vCPU. In an embodiment, the memory access metric correlates with the memory access bandwidth demand of the VM.

Figure 1A:
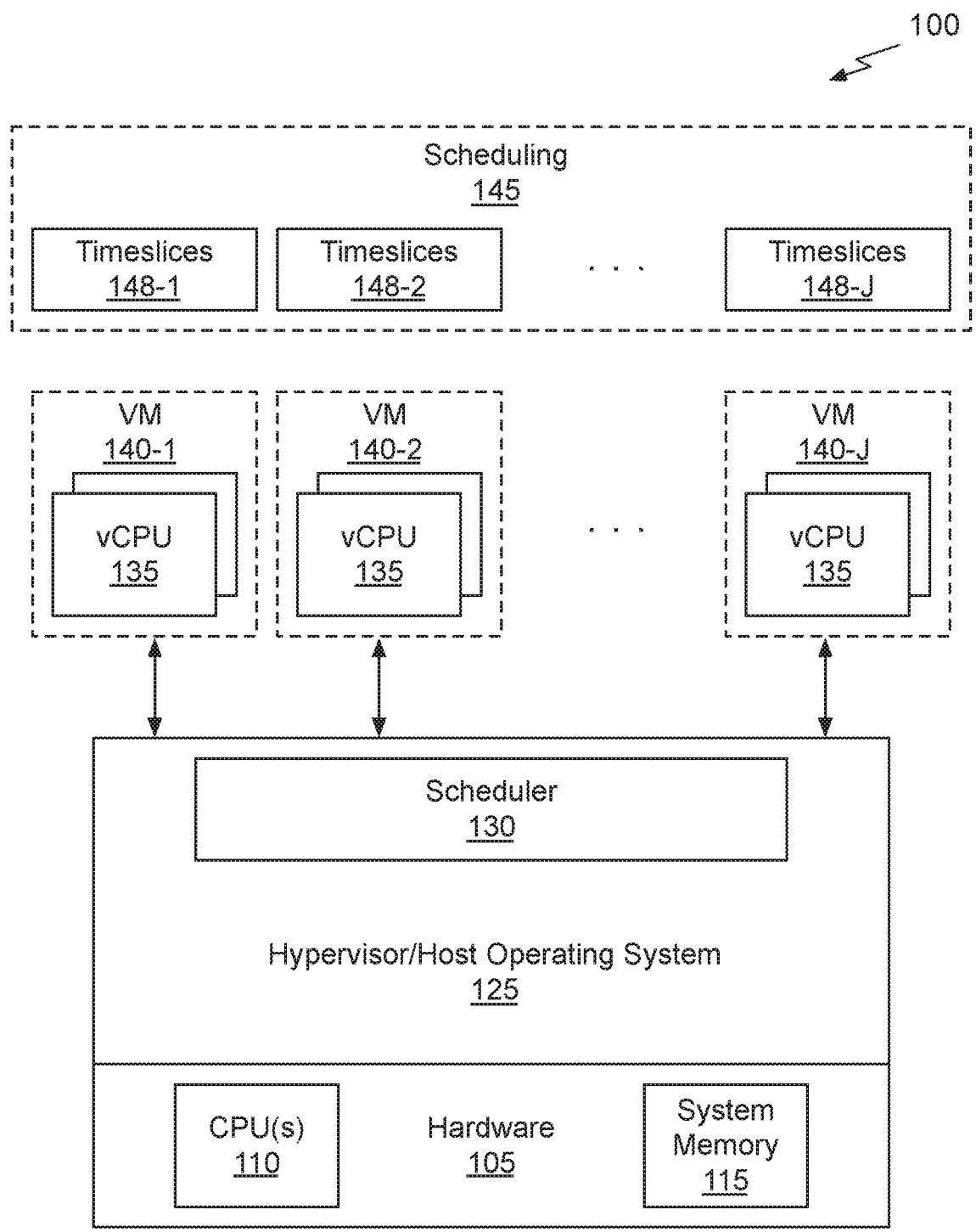
FIG. 1A illustrates a block diagram of an example cloud computing environment suitable for use in implementing some embodiments of the present disclosure.

FIG. 1A illustrates a block diagram of an example cloud computing environment 100 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the cloud computing environment 100 is within the scope and spirit of embodiments of the present disclosure.

As shown in FIG. 1A, hardware 105 of the cloud computing environment 100 includes at least computing resources of CPU(s) 110 and system memory 115. Other types of shared and/or dedicated resources (not shown) may also be included in the cloud computing environment 100.

Memory bandwidth for accessing the system memory 115 is shared by the VMs 140 that are each assigned at least one vCPU 135 (virtual processor). A vCPU 135 represents computing resources dedicated for use by the VM 140 to which the vCPU 135 is assigned. In an embodiment, each vCPU 135 is a physical core within the CPU(s) 110. In an embodiment, each vCPU 135 comprises one or more physical cores within the CPU(s) 110. In another embodiment, each vCPU 135 comprises a portion of a physical core within the CPU(s) 110.

Timeslices 148 are allocated to each VM 140 by a scheduler 130 within a hypervisor/host operating system 125. Scheduling 145 represents the allocation of timeslices 148 to the different VMs 140. For example, the timeslices 148-1 is a set of timeslices that are allocated to the VM 140-1. In an embodiment, the timeslices 148 each correspond to a different time interval and each of the VMs 140 is allocated one timeslice 148 in sequence, before being allocated another timeslice 148, so that the timeslices 148 allocated to a particular VM 140 are spread over time. Over time, each VM 140 is allocated a set of timeslices 148 (e.g., timeslices 148-1, 148-2, etc.). In an embodiment, the timeslices are allocated according to a time division multiplexing scheme to provide each VM 140 exclusive use of the computing resources.

In another embodiment, the timeslices 148 are distributed to the VMs 140 according to a defined allocation, such that one VM 140 may be allocated N times as many timeslices as another VM 140. In an embodiment, the timeslices 148 are equal durations of time. For example, 500 ms is divided into five timeslices 148, and the scheduler 130 allocates a 100 ms timeslice to each one of five VMs 140. In another embodiment, durations of the timeslices 148 may vary and are specified for each VM 140.

During an allocated timeslice 148, the VM 140 may use the processing resources of the computing system, particularly the CPU(s) 110 and system memory 115. Allocation of dedicated timeslices 148 to each VM 140 provides an isolation mechanism for the VMs 140 to share the processing resources within the hardware 105. The hypervisor/host operating system 125 interfaces between the VMs 140 and hardware 105, including the CPU(s) 110 and the system memory 115.

The hypervisor/host operating system 125 is a software layer that may be configured as a hypervisor that also performs operating system functions and runs directly on the hardware 105. Alternatively, the hypervisor/host operating system 125 may be configured as a host operating system that runs directly on the hardware 105 and a hypervisor that is a software layer running on the host operating system. The hypervisor/host operating system 125 creates and manages multiple VMs 140 to support virtualization of the hardware 105.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
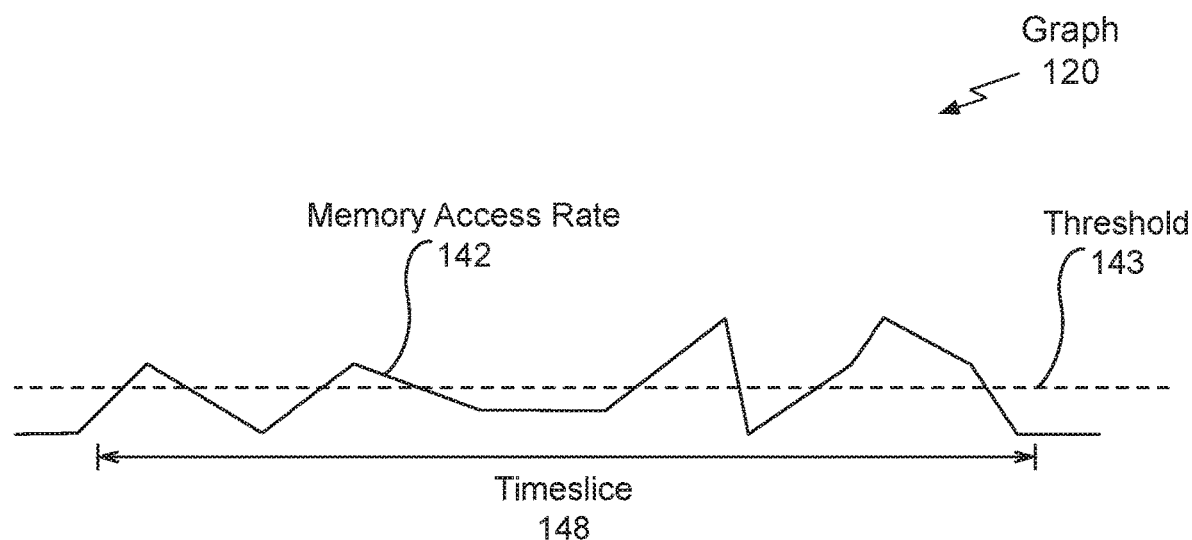
FIG. 1B illustrates a graph of memory access rate during a timeslice, in accordance with an embodiment.

FIG. 1B illustrates a graph 120 of a memory access rate 142 during a timeslice 148, in accordance with an embodiment. The memory access rate 142 for the timeslice 148 allocated to the VM 140 varies within the timeslice 148. In an embodiment, a single threshold value 143 is defined for all of the VMs 140. In another embodiment, separate threshold values may be defined for one or more VMs 140. When the memory access rate for the VM 140 exceeds the threshold value 143, the scheduler 130 dynamically throttles the VM 140 by idling the vCPU(s) 135 allocated to the VM 140 for at least a portion of the set of timeslices 148 allocated to the VM 140. As shown in FIG. 1B, the memory access rate 142 for the VM 140 exceeds the threshold 143 four times during the timeslice 148. The amount of throttling may increase if the memory access rate 142 remains above the threshold 143. In an embodiment, the amount of throttling is determined based on an amount by which the memory access rate 142 exceeds the threshold 143 (i.e., a difference between the memory access rate 142 and the threshold value 143). The amount may be an instantaneous maximum, accumulated over time, or computed using a function.

Figure 1C:
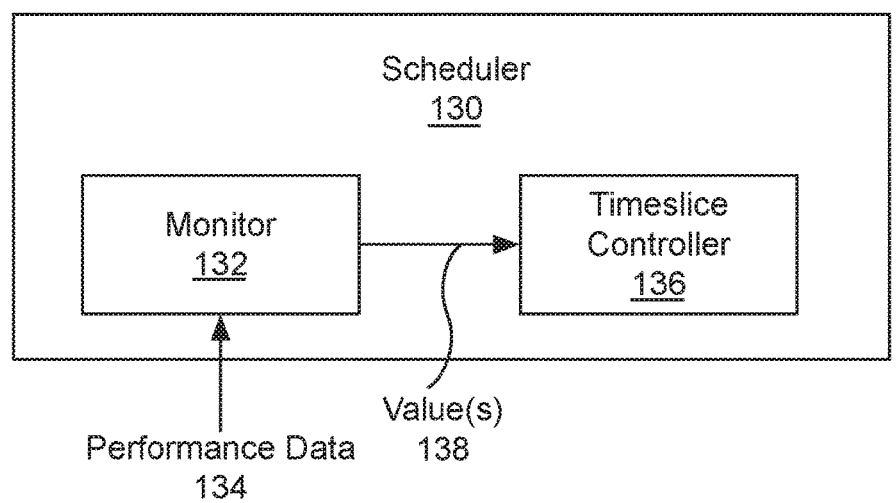
FIG. 1C illustrates a block diagram of an example scheduler shown in FIG. 1A suitable for use in implementing some embodiments of the present disclosure.

FIG. 1C illustrates a block diagram of a scheduler 130 shown in FIG. 1A suitable for use in implementing some embodiments of the present disclosure. The scheduler 130 includes a monitor 132 and timeslice controller 136. The performance data 134 for each VM 140 is sampled at least once during a monitoring time interval by the monitor 132 and value(s) 138 are provided to the scheduler 130. The monitoring time interval may include one or more timeslices 148 or only a portion of a timeslice 148. In an embodiment, the monitoring time interval is predetermined or programmable. In an embodiment, the performance data 134 is sampled every 10 milliseconds by the monitor 132 to generate the value(s) 138.

In an embodiment, the performance data 134 is sampled once during each monitoring time interval by the monitor 132 to generate the value(s) 138. In an embodiment, a moving average of the performance data 134 is computed by the monitor 132 and provided as the value(s) 138, where the performance data 134 is sampled at least once each timeslice 148. Compared with sampling once during each monitoring time interval, the moving average may result in a better quality of throttling over time, but with a longer reaction time.

In an embodiment, the performance data 134 includes a last level cache miss (LLCM) rate that corresponds to the memory access rate. The LLCM rate indicates the number of memory accesses per unit time that were not satisfied by any cache level, and therefore resulted in a system memory access. In an embodiment, the LLCM rate is tracked for each vCPU 110 assigned to a VM 140 and aggregated to determine an overall LLCM rate for the VM 140. In general, when the overall LLCM rate for each VM 140 is less than or equal to the threshold 143, then each VM 140 is able to access the system memory without negatively impacting the other VMs 140.

In an embodiment, the last level cache (LLC) is the highest-level cache that is shared by all cores in one of the CPU(s) 110. In an embodiment, the LLC is a level-2 (L2) cache. In other embodiments, the LLC is a level-3 (L3) or a level-1 (L1) cache. At the end of each monitoring time interval, any VM 140 having a memory access rate that exceeds the threshold value is deemed "noisy" and is throttled by the timeslice controller 136. In an embodiment, the scheduler 130 maintains multiple threshold values, as many as one for each VM 140. In an embodiment, the threshold value(s) may be constant, predetermined, or programmed.

Various dynamic throttling techniques may be used by the scheduler 130 to idle the vCPU(s) 135 assigned to a noisy VM 140. When a vCPU 135 is throttled or memory access rate limited by forcing the vCPU 140 into an idle state, the vCPU 135 pauses execution of code for the VM 140 and the execution state is preserved. In an embodiment, when a throttled VM 140 has a memory access rate 142 that does not exceed the threshold 143, the throttling ceases.

Figure 1D:
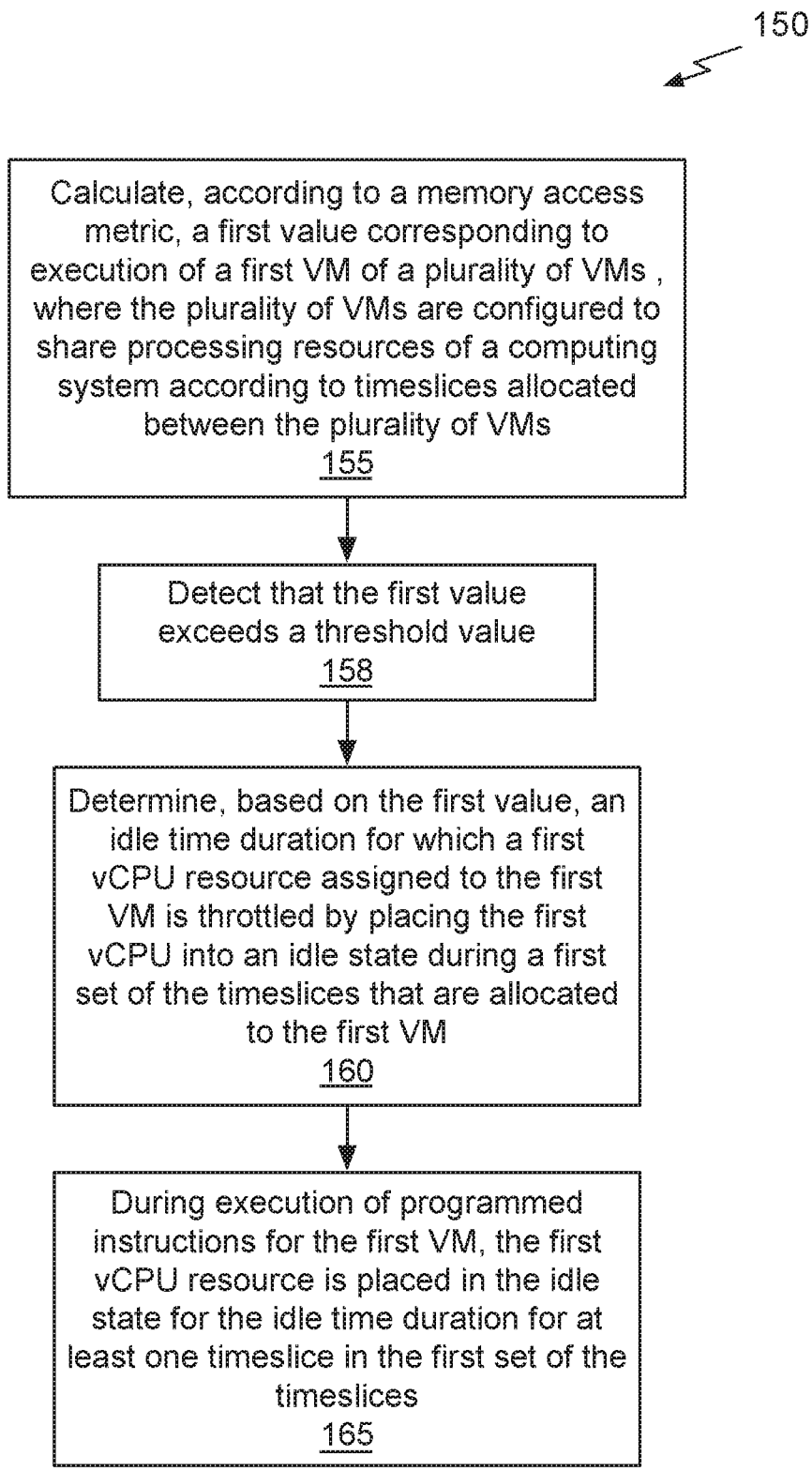
FIG. 1D illustrates a flowchart of a method for performing memory bandwidth throttling for VMs, in accordance with an embodiment.

FIG. 1D illustrates a flowchart of a method 150 for performing memory bandwidth throttling for VMs 140, in accordance with an embodiment. Each block of method 150, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 150 is described, by way of example, with respect to the system of FIG. 1A. However, this method may additionally or alternatively be executed by any one system, or any combination of systems, including, but not limited to, those described herein. Furthermore, persons of ordinary skill in the art will understand that any system that performs method 150 is within the scope and spirit of embodiments of the present disclosure.

At step 155, the scheduler 130 calculates, according to a memory access metric, a first value corresponding to execution of a first VM 140 of the plurality of VMs 140, where the plurality of VMs 140 are configured to share processing resources of a computing system according to the timeslices 148 allocated between the plurality of VMs 140. In an embodiment, the computing system comprises the hardware 105. In another embodiment, the computing system comprises the hardware 105 and the hypervisor/host operating system 125.

In an embodiment, the first VM 140 may degrade system memory access latencies of the other VMs 140 when the first VM 140 is allowed to run workloads that have a higher system memory access rate than the workloads running in the other VMs 140. In a steady state, all VMs 140 may be driving system memory accesses at different rates. When the first VM 140 starts increasing its rate, less system memory bandwidth is available for the other VMs 140, potentially increasing system memory access latency for the other VMs 140. In a cloud streaming scenario, reduced system memory bandwidth or increased system memory access latency can manifest as blurriness and blocky artifacts in video frames, a drop in frames rendered per second, and/or stuttering in the gameplay running in the other VMs 140.

At step 158, the scheduler 130 detects that the first value exceeds the threshold value 143. At step 160, based on the first value, the scheduler 130 determines an idle time duration for which a first vCPU 135 resource assigned to the first VM 140 is throttled by placing the first vCPU 135 into an idle state during a first set of the timeslices 148 that are allocated to the first VM 140. In an embodiment, the idle time duration is applied within the at least one timeslice. In an embodiment, the first VM 140 consists of the VM 140-1 and the first set of the timeslices 148 consists of the timeslices 148-1. In an embodiment, all of the vCPUs 135 assigned to the first VM 140 are throttled by placing them into the idle state during the first set of the timeslices 140 allocated to the first VM 140. In an embodiment, the scheduler 130 includes a neural network that is trained to predict an optimal duration for idling a vCPU based on a configuration of vCPUs or VMs in a system and one or more memory access metrics to provide sufficient access to memory for workloads using the same shared pool of resources.

At step 165, during execution of programmed instructions for the first VM 140-1, the first vCPU 135 is placed into the idle state for the idle time duration for at least one timeslice in the first set of the timeslices 148-1. In an embodiment, the idle time duration is applied to more than one timeslice in the first set of the timeslices 148-1. In an embodiment, a duty cycle is determined based on the idle time duration for the timeslices 148-1. In an embodiment, the duty cycle is defined by a percentage of the timeslice. In an embodiment, the scheduler 130 places the vCPU into the idle state for the idle time duration and enables the vCPU for processing after the idle time duration. The duty cycle is applied to at least one timeslice in the timeslices 148-1. In an embodiment, the idle time duration is applied within each one of N timeslices included in the timeslices 148-1, where N is an integer greater than one. In an embodiment, the idle time duration is determined by a duty cycle applied across N timeslices within the timeslices 148-1. In an embodiment, each timeslice in the timeslices 148-1 is subdivided into M intervals and the idle time duration is applied to each one of the M intervals, where M is an integer greater than one.

Figure 2A:
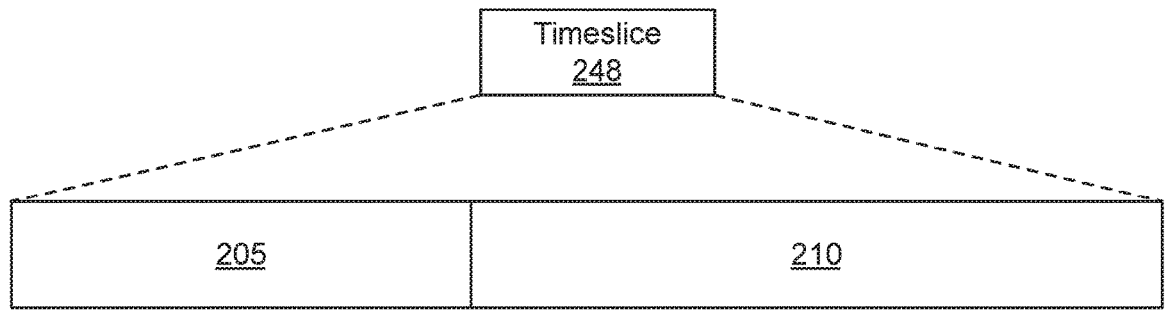
FIG. 2A illustrates an example duty-cycle of a timeslice, in accordance with some embodiments of the present disclosure.

FIG. 2A illustrates an example duty-cycle of a timeslice 248, in accordance with some embodiments of the present disclosure. A duty cycle is determined based on the idle time duration. As shown in FIG. 2A, the duty cycle is 60% and the timeslice 248 is subdivided into an active partition 205 (40% of the timeslice 248) and an idle partition 210 (60% of the timeslice 248).

Figure 2B:
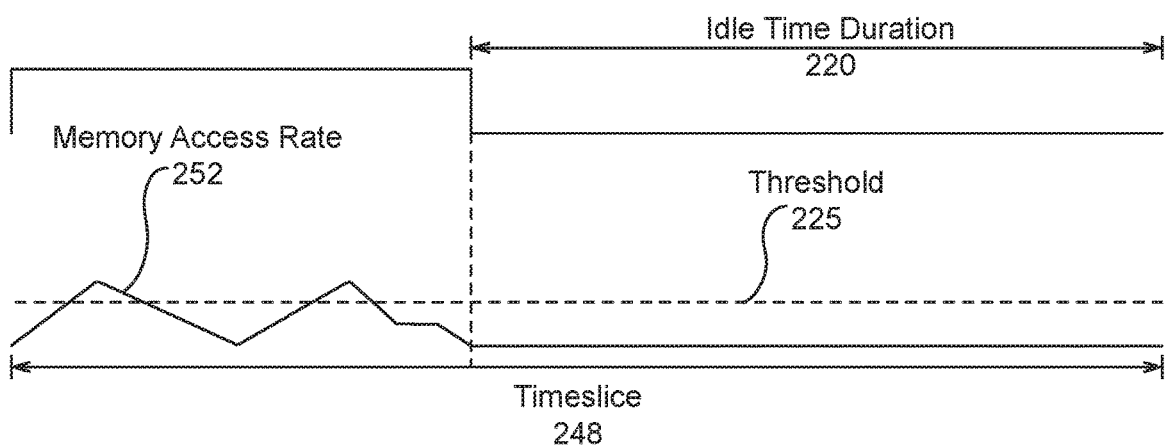
FIG. 2B illustrates an example graph of the throttled memory access rate, in accordance with some embodiments of the present disclosure.

FIG. 2B illustrates an example graph of a throttled memory access rate 252, in accordance with some embodiments of the present disclosure. The memory access rate 142 shown in FIG. 1B may be throttled by the scheduler 130 to produce the throttled memory access rate 252. Although only a single timeslice 248 is illustrated, multiple timeslices 248 are allocated to each VM 140 by the scheduler 130. An idle time duration 220 is determined by the scheduler 130 and is used to control the duty cycle.

The duty cycle of 40% may be applied within each timeslice 248 to produce an idle time duration 220 for a noisy VM 140. The vCPU(s) 110 assigned to the noisy VM 140 are active during 40% of each timeslice 248 corresponding to the active partition 205. The vCPU(s) 110 assigned to the noisy VM 140 are idle for the remainder (60%) of each timeslice 248 corresponding to the idle partition 210. The overall memory access rate 252 for the throttled timeslices 248 is reduced compared with the memory access rate 142. As shown in FIG. 2B, the throttled memory access rate 252 exceeds a threshold 255 during the active partition 205 and does not exceed the threshold 255 during the idle partition 210.

Figure 2C:
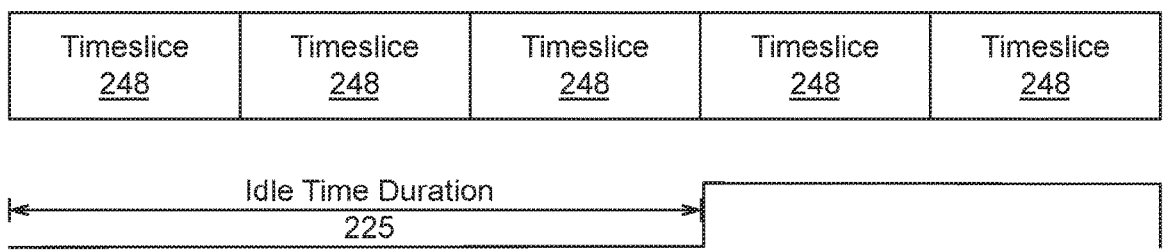
FIG. 2C illustrates an example duty-cycle applied across timeslices, in accordance with some embodiments of the present disclosure.

FIG. 2C illustrates an example duty-cycle applied across timeslices, in accordance with some embodiments of the present disclosure. Instead of applying the duty cycle within each timeslice 248, the duty cycle may be applied across a time period of N timeslices 248, so that the vCPU(s) 110 assigned to the noisy VM 140 are idle during 60% of the N timeslices 248 and the vCPU(s) 110 assigned to the noisy VM 140 are active during 40% of the N timeslices 248. As shown in FIG. 2C, N=5 and the vCPU(s) 110 assigned to the noisy VM 140 is placed in an idle state for the three of the five timeslices 248. An idle time duration 225 equals the idle time duration 220 scaled by N.

Figure 2D:
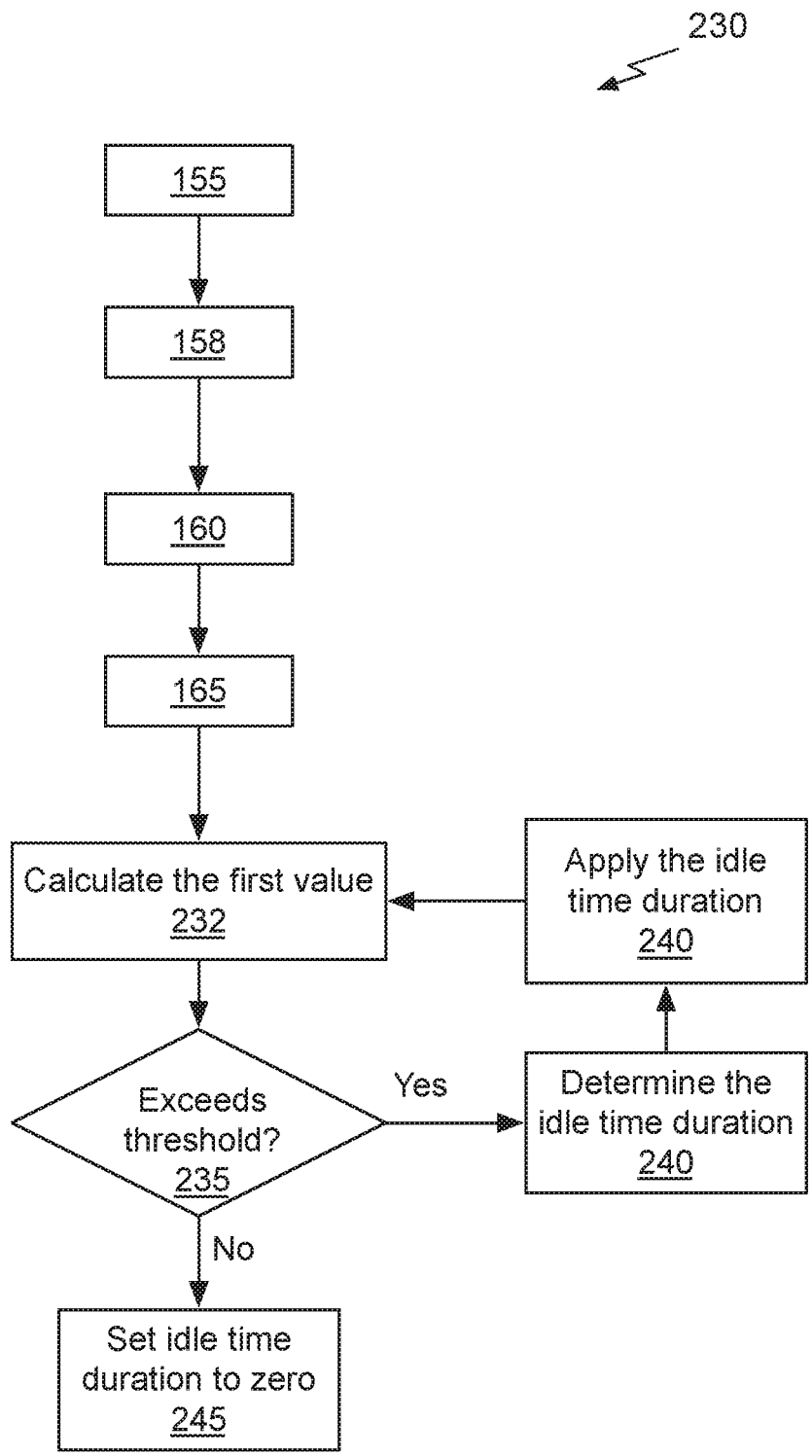
FIG. 2D illustrates a flowchart of another method for performing memory bandwidth throttling for VMs, in accordance with an embodiment.

FIG. 2D illustrates a flowchart of another method 230 for performing memory bandwidth throttling for VMs 140, in accordance with an embodiment. The method 230 includes steps 155, 158, 160, and 165 of the method 150. Steps 155, 158, 160, and 165 are performed as previously described. At step 232, the scheduler 130 calculates the first value to update the first value following the throttling. At step 235, the scheduler 130 determines if performance data or performance value(s) according to one or more metric(s) exceeds the respective threshold values.

If, at step 235, the scheduler 130 determines that the performance data or performance value(s) exceeds the threshold value, then at step 240 the scheduler 130 determines the idle time duration. The scheduler 130 may increase the idle time duration to control the memory access bandwidth of the first VM 140. In an embodiment, the scheduler 130 holds the idle time duration constant until the performance data or performance value(s) are reduced equal to or below the threshold value. In another embodiment, the scheduler 130 increases the idle time duration until the performance data or performance value(s) are reduced below the threshold value. In an embodiment, the idle time duration may be changed for each subsequent timeslice 248 allocated to the first VM 140, increasing, or decreasing the duty cycle in increments based on the measured memory access rate for the previous timeslice 248. The increments may be equally spaced (e.g., 100%, 90%, 80%, . . . 10%) or non-linear (e.g., 100%, 63%, 40%, 25%, 16%, 10%). At step 240, the scheduler 130 applies the idle time duration to control the memory access bandwidth of the first VM 140.

If, at step 235, the scheduler 130 determines that the performance data or performance value(s) do not exceed the threshold value, then at step 245 the scheduler 130 sets the idle time duration to zero for the first VM 140. In an embodiment, the monitor 132 measures a response time from when throttling is initiated for a noisy VM 140 until the performance data or performance value(s) according to the metric(s) fall below the threshold value. In an embodiment, the monitor 132 measures a response time from when a noisy VM 140 is first detected (the performance data or performance value(s) according to the metric(s) exceed the threshold value) until the performance data or performance value(s) according to the metric(s) fall below the threshold value in response to throttling. The response time may be used by the timeslice controller 136 to determine the idle time duration.

Figure 3A:
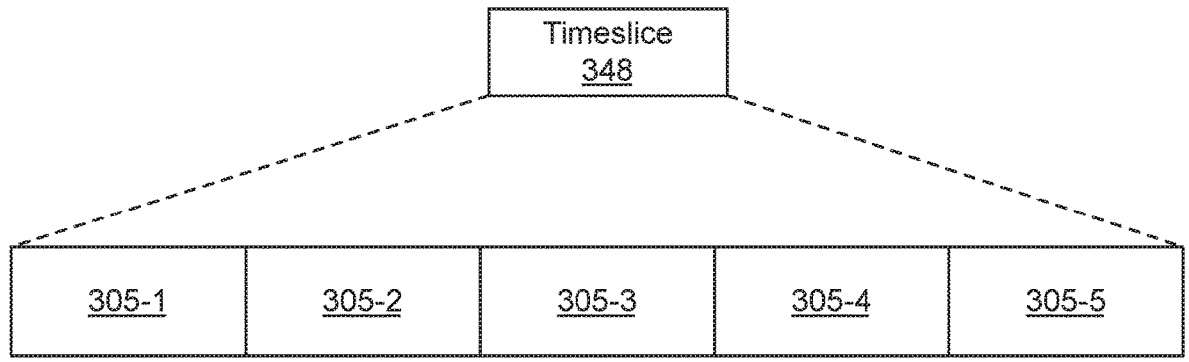
FIG. 3A illustrates an example of a sub-divided timeslice, in accordance with some embodiments of the present disclosure.

FIG. 3A illustrates an example of a timeslice 348 that is subdivided into multiple intervals 305, in accordance with some embodiments of the present disclosure. In an embodiment, the timeslice 348 is divided into M intervals 305-1 through 305-5, and the duty cycle is applied to each interval 305 within the timeslice 348. Each smaller interval 305 is the timeslice duration divided by M. The value of M may be predetermined, constant, or programmed.

Figure 3B:
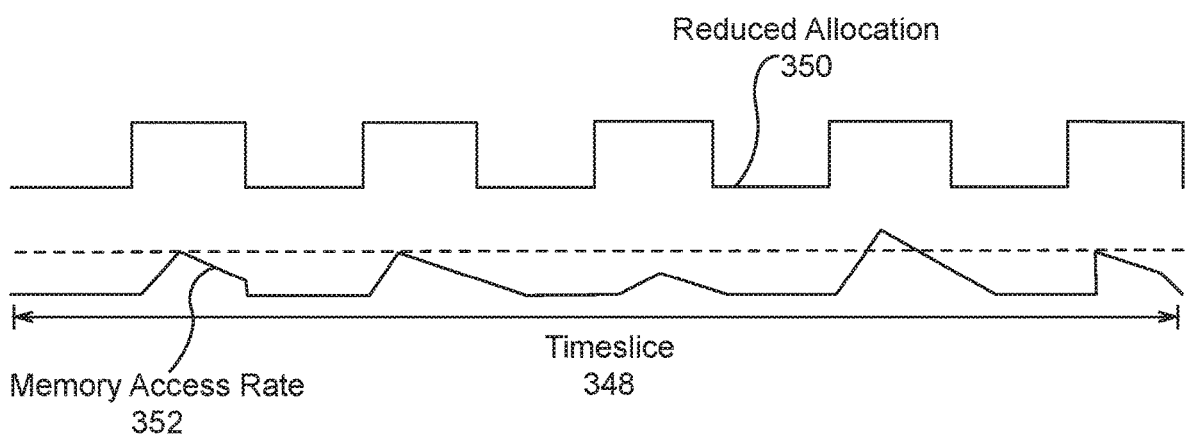
FIG. 3B illustrates another example graph of the throttled memory access rate, in accordance with some embodiments of the present disclosure.

FIG. 3B illustrates another example graph of a throttled memory access rate 352, in accordance with some embodiments of the present disclosure. Dividing the timeslice 348 into M intervals produces a reduced allocation 350 of M smaller idle time durations. As shown in FIG. 3B, M=5 and a duty cycle of 50% is applied to each one of the five intervals 305-1 through 305-5 in the timeslice 348. For the timeslice 248 shown in FIG. 2A, the duty cycle =40% and M=1. In another embodiment, the duty cycle is applied over a time period of N timeslices allocated to the noisy VM 140, so the vCPU(s) 110 assigned to the noisy VM 140 are active for N*duty cycle timeslices and are idle for the remaining timeslices in the time period.

Figure 3C:
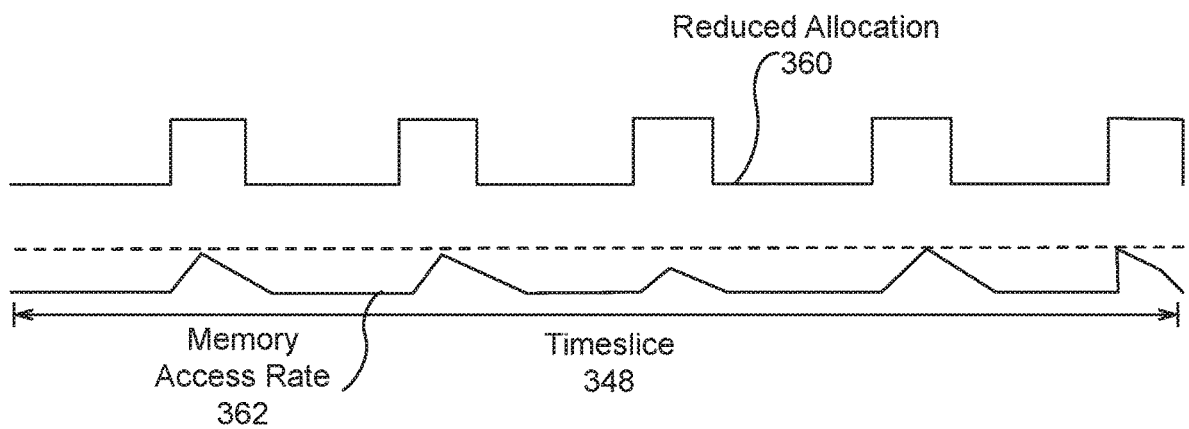
FIG. 3C illustrates another example graph of the throttled memory access rate, in accordance with some embodiments of the present disclosure.

FIG. 3C illustrates another example graph of the throttled memory access rate 362, in accordance with some embodiments of the present disclosure. The timeslice 348 is divided into M smaller idle time intervals, where the duty cycle is applied to each idle time interval. As shown in FIG. 3C, M=5 and a duty cycle of 40% is applied to each one of the five intervals 305-1 through 305-5 in the timeslice 348 to produce a reduced allocation 360. Compared with the throttled memory access rate 352, the throttled memory access rate 362 is further reduced, as expected because the idle time duration is increased.

Applying the duty cycle to each interval within a timeslice provides fine grained throttling compared with applying the duty cycle to a time period including N timeslices. Applying the duty cycle within each timeslice provides a frequency of throttling between the fine grained interval-based throttling and the coarse-grained time period based throttling.

The scheduler 130 provides a software solution for real-time monitoring of performance data 134, such as memory access rates and dynamic throttling of noisy VMs 140 based on the values(s) 138 of the performance data. The scheduler 130 may implement a variety of different throttling techniques to provide fine or coarse throttling of the timeslices allocated to a noisy VM 140. An idle time duration is determined and applied as a duty cycle within each timeslice or across multiple timeslices. In contrast to conventional systems, the software solution for dynamic throttling is portable across CPU families and doesn't require specialized server-class CPU capabilities or limit the system configuration. Memory access throttling may be applied to reduce memory access starvation and uphold the principle of VM isolation in cloud computing.

Parallel Processing Architecture

Figure 4:
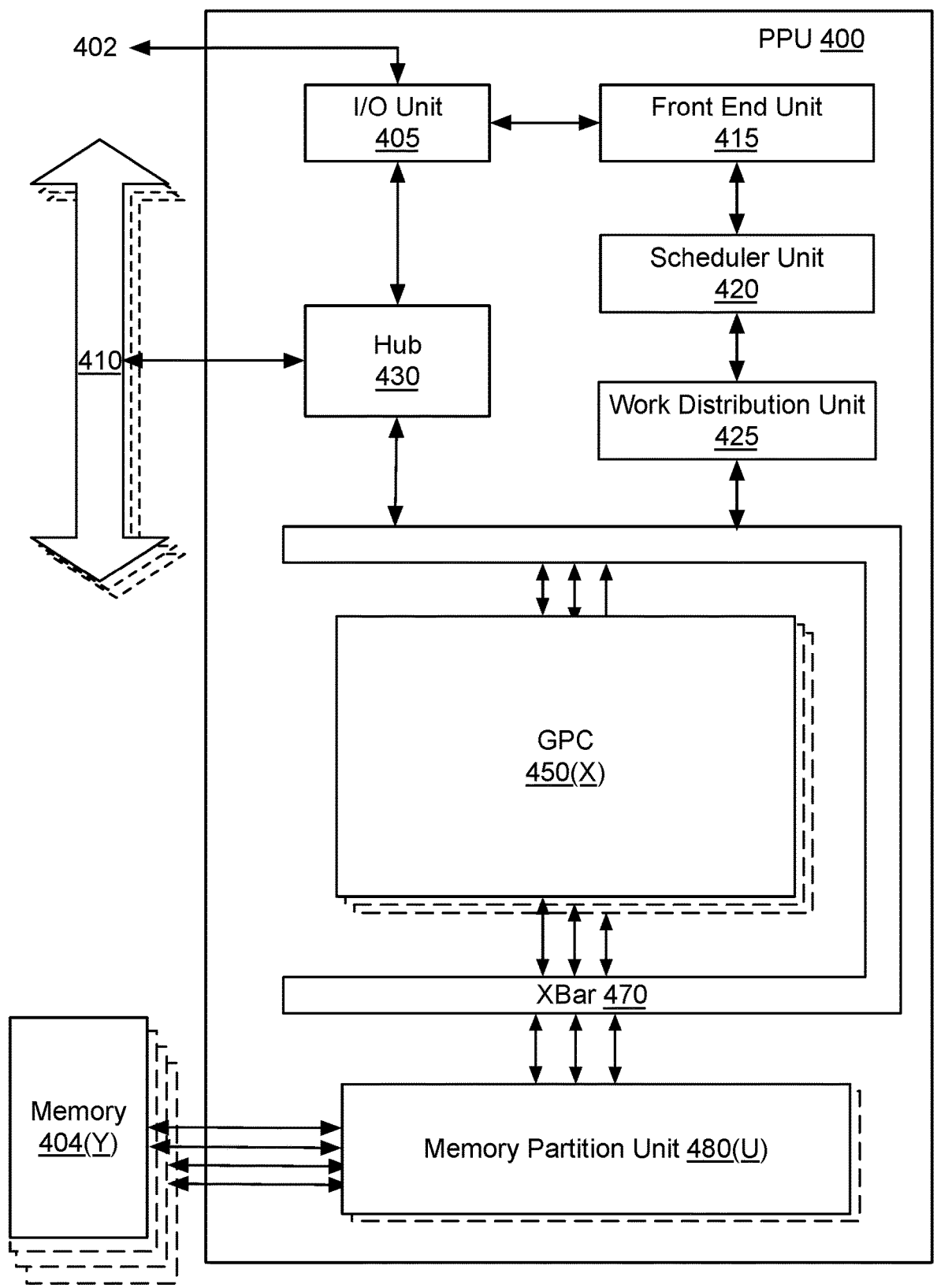
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the CPU(s) 110 and/or scheduler 130 of the cloud computing environment 100.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5A.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 430 may each include, and/or be configured to perform functions of, one or more processing cores and/or components thereof, such as Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC)

CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
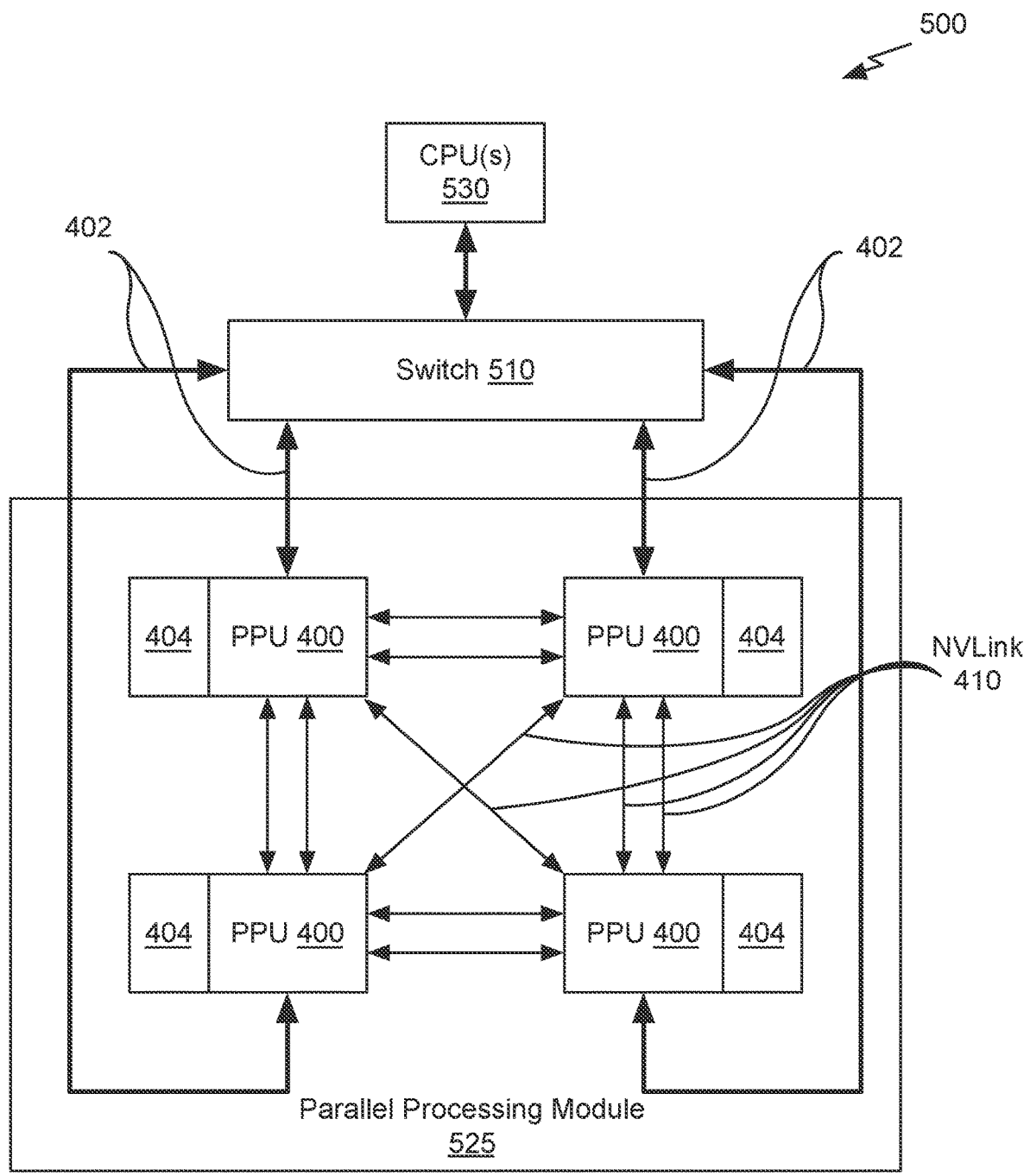
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the method 150 and/or 230 shown in FIGS. 1D and 2D, respectively. The processing system 500 includes a CPU 530, switch 510, and multiple PPUs 400, and respective memories 404.

The NVLink 410 provides high-speed communication links between each of the PPUs 400. Although a particular number of NVLink 410 and interconnect 402 connections are illustrated in FIG. 5A, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

Figure 5B:
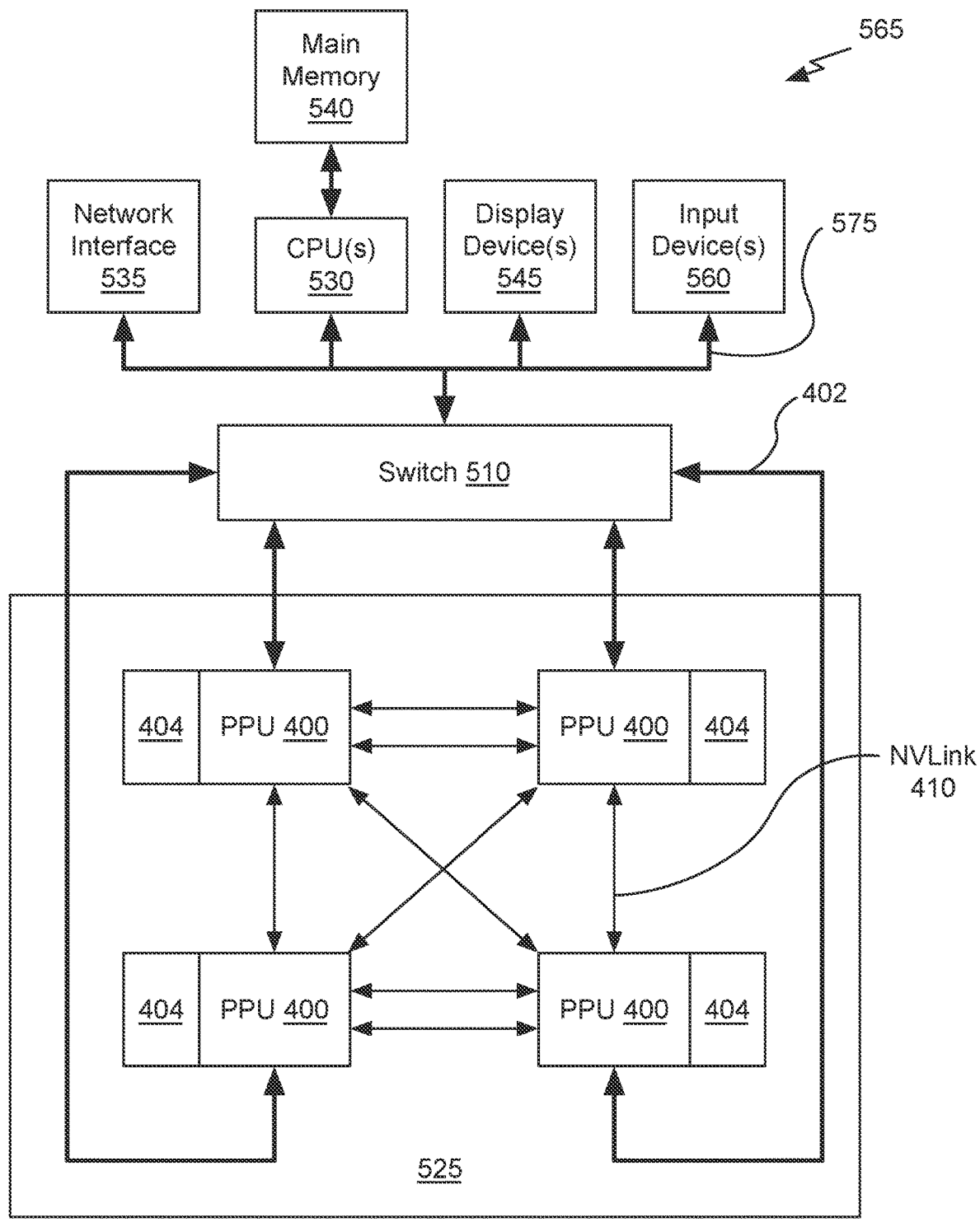
FIG. 5B illustrates an exemplary system in which the various architecture and/or functionality of the various previous embodiments may be implemented.
Figure 5C:
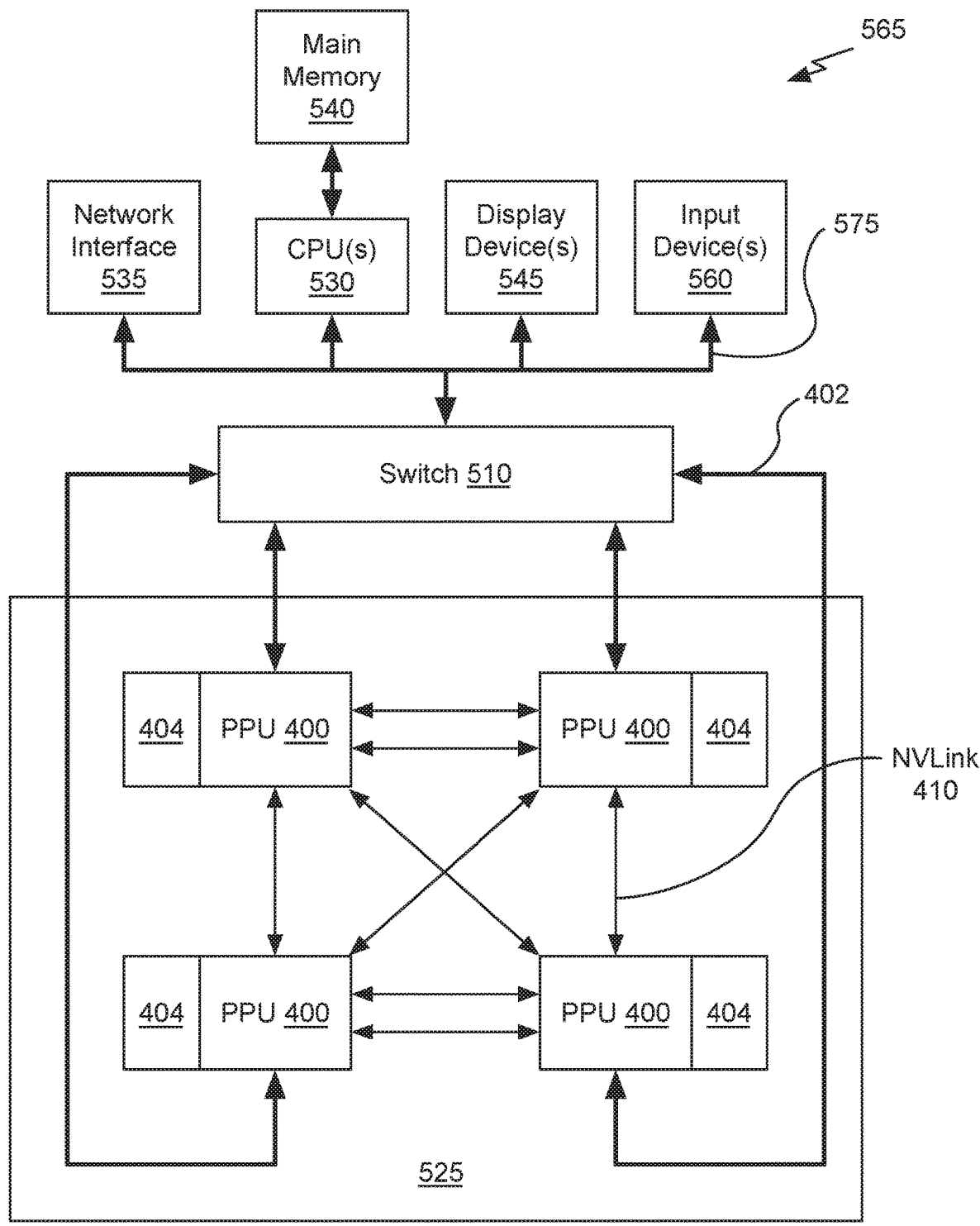

In an embodiment, the signaling rate of each NVLink 410 is 20 to 25 Gigabits/second and each PPU 400 includes six NVLink 410 interfaces (as shown in FIG. 5B, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 150 and/or 230 shown in FIGS. 1D and 2D, respectively.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 400 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6A:
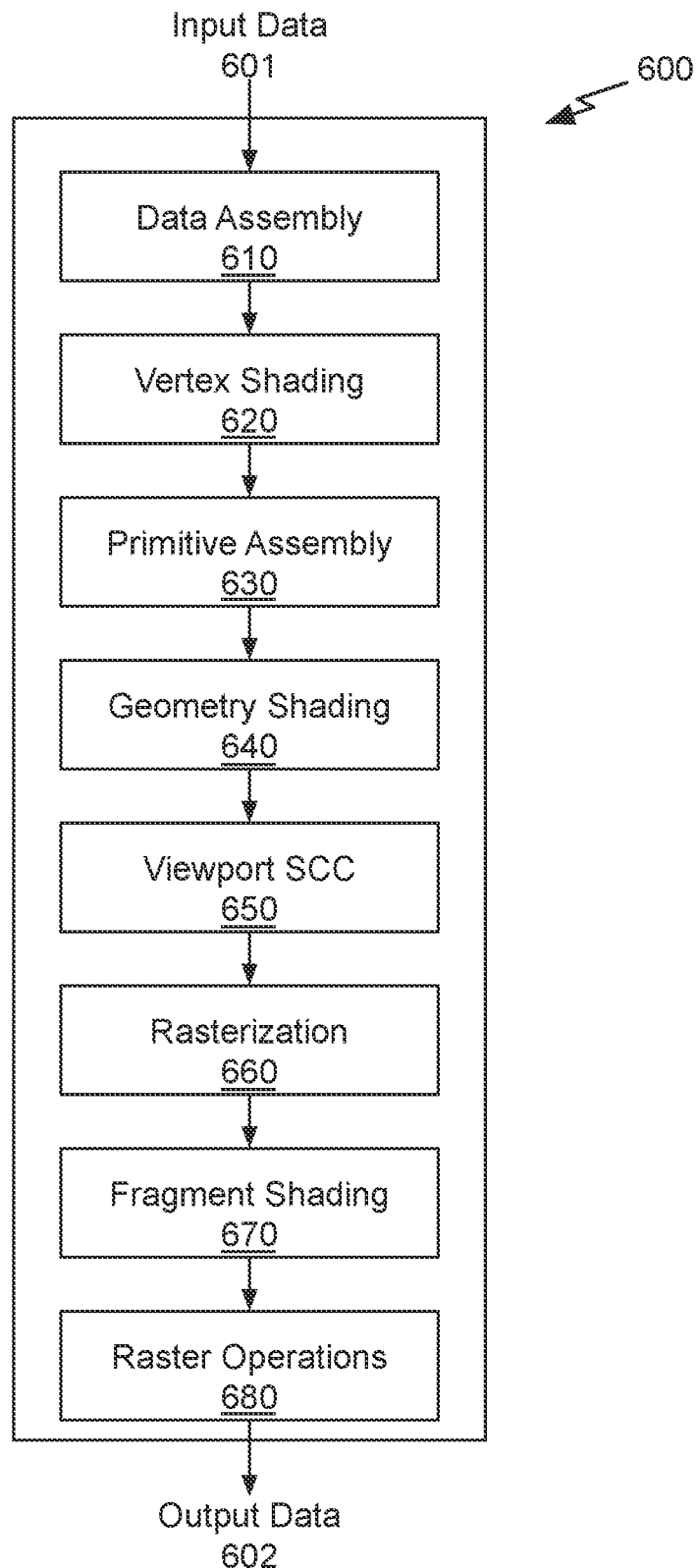
FIG. 6A is a conceptual diagram of a graphics processing pipeline implemented by the PPU of FIG. 4 suitable for use in implementing some embodiments of the present disclosure.

FIG. 6A is a conceptual diagram of a graphics processing pipeline 600 implemented by the PPU 400 of FIG. 4, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640).

Other types of graphics processing pipelines are contemplated as being within the scope of the present disclosure. Furthermore, any of the stages of the graphics processing pipeline 600 may be implemented by one or more dedicated hardware units within a graphics processor such as PPU 400. Other stages of the graphics processing pipeline 600 may be implemented by programmable hardware units such as the SM 440 of the PPU 400.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline 600 utilizing the hardware of the PPU 400.

Various programs may be executed within the PPU 400 in order to implement the various stages of the graphics processing pipeline 600. For example, the device driver may launch a kernel on the PPU 400 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Game Streaming System

Figure 6B:
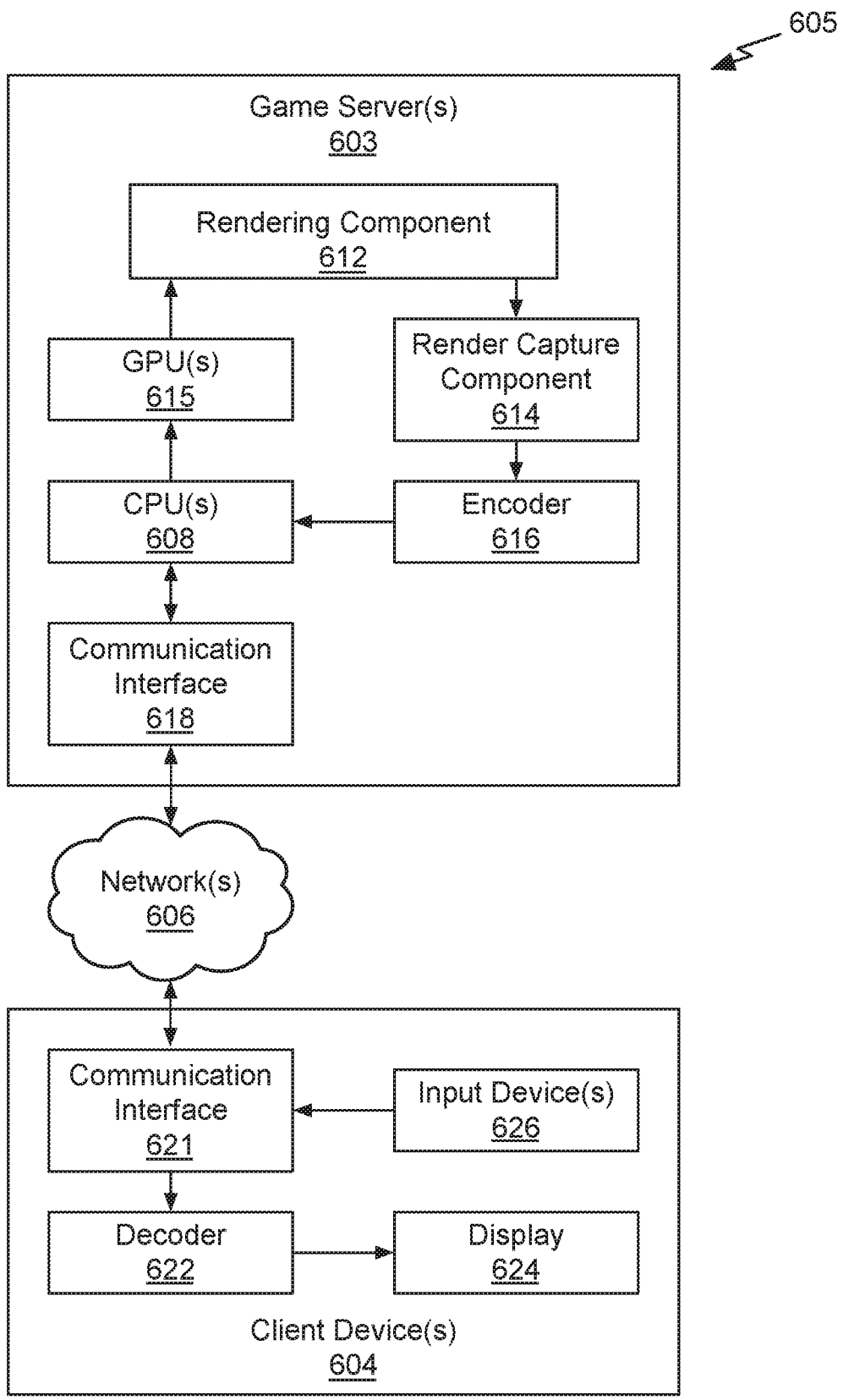
FIG. 6B illustrates an exemplary game streaming system suitable for use in implementing some embodiments of the present disclosure.

FIG. 6B is an example system diagram for a game streaming system 605, in accordance with some embodiments of the present disclosure. The game streaming system 605 may be used in combination with or in place of the cloud computing environment 100 of FIG. 1A. In particular, the game server(s) 603 may be replaced with the cloud computing environment 100.

FIG. 6B includes game server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s) 626, transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) 615 of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) 626 and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device)

is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
    calculating, according to a memory access metric, a first value corresponding to an execution of a first virtual machine (VM) of a plurality of VMs, the plurality of VMs being configured to share processing resources of a computing system according to timeslices allocated between the plurality of VMs;
    detecting that the first value exceeds a threshold value;
    determining, based on the first value, an idle time duration for which a first virtual CPU resource assigned to the first VM is placed into an idle state during a first set of the timeslices that are allocated to the first VM, wherein the first virtual CPU resource comprises at least one virtual CPU assigned to the first VM;
    during execution of programmed instructions for the first VM, causing the first virtual CPU resource to be placed in the idle state for the idle time duration for at least one timeslice in the first set of the timeslices,
    detecting, after the at least one timeslice, that the first value has decreased;
    reducing the idle time duration for the first VM; and
    causing the first virtual CPU resource to be placed in the idle state for the reduced idle time duration during a subsequent timeslice in the first set of the timeslices that is after the at least one timeslice.

2. The computer-implemented method of claim 1, wherein the idle time duration is applied within each one of N timeslices within the first set of timeslices.

3. The computer-implemented method of claim 1, wherein a duty cycle based on the idle time duration is applied across N timeslices included in the first set of timeslices.

4. The computer-implemented method of claim 1, wherein the first timeslice is divided into M intervals and the idle time duration is applied within each one of the M intervals.

5. The computer-implemented method of claim 1, wherein the memory access metric comprises a last level cache miss rate.

6. The computer-implemented method of claim 1, wherein the memory access metric comprises at least one of: a memory access rate, an average memory access rate, or a count of memory accesses during a defined time interval.

7. The computer-implemented method of claim 1, further comprising tracking performance data according to the memory access metric for each VM in the plurality of VMs.

8. The computer-implemented method of claim 1, wherein performance data is sampled at least once each timeslice in the first set of the timeslices to produce the first value.

9. The computer-implemented method of claim 1, further comprising:
   detecting that the first value is equal or lower than the threshold value;
   reducing the idle time duration for the first VM to zero; and
   causing the first virtual CPU resource to be active during a subsequent timeslice in the first set of the timeslices.

10. The computer-implemented method of claim 1, wherein the first virtual CPU resource comprises multiple virtual CPUs assigned to the first VM.

11. The computer-implemented method of claim 1, further comprising:
   detecting that a second value according to a second memory access metric for a second VM of the plurality of VMs exceeds a second threshold value;
   determining, based on the second value, a second idle time duration for which a second virtual CPU resource assigned to the second VM is throttled by placing the second virtual CPU into the idle state during a second set of the timeslices that are allocated to the second VM, wherein the second virtual CPU resource comprises at least one virtual CPU assigned to the second VM; and
   during execution of programmed instructions for the second VM, causing the second virtual CPU resource to be placed into the idle state for the second idle time duration for at least one timeslice in the second set of the timeslices.

12. The computer-implemented method of claim 11, wherein the second threshold value is different compared with the threshold value.

13. The computer-implemented method of claim 1, wherein the steps of detecting, determining, and throttling are executed using one or more computing resources of a cloud computing environment.

14. The computer-implemented method of claim 1, wherein the step of determining the idle time duration is performed by a neural network.

15. The computer-implemented method of claim 1, wherein the computing system is used for training, testing, or certifying a neural network employed in a machine, robot, or autonomous vehicle.

16. A system, comprising:
   a computing system comprising processing resources shared by a plurality of virtual machines (VMs); and
   a hypervisor that is configured to:
   calculate, according to a memory access metric, a first value corresponding to an execution of a first VM of the plurality of VMs, the plurality of VMs being configured by the hypervisor to share the processing resources according to timeslices allocated between the plurality of VMs;
   detect that the first value exceeds a threshold value;
   determine, based on the first value, an idle time duration for which a first virtual CPU resource assigned to the first VM is placed into an idle state during a first set of the timeslices that are allocated to the first VM, wherein the first virtual CPU resource comprises at least one virtual CPU assigned to the first VM; and
   during execution of code for the first VM, cause the first virtual CPU resource to be placed in the idle state for the idle time duration for at least one timeslice in the first set of the timeslices,
   detecting, after the at least one timeslice, that the first value has decreased;
   reducing the idle time duration for the first VM; and
   causing the first virtual CPU resource to be placed in the idle state for the reduced idle time duration during a subsequent timeslice in the first set of the timeslices that is after the at least one timeslice.

17. The system of claim 16, wherein the hypervisor is further configured to apply the idle time duration within each one of N timeslices within the first set of timeslices.

18. The system of claim 16, wherein a duty cycle based on the idle time duration is applied across N timeslices included in the first set of timeslices.

19. A non-transitory computer-readable media storing computer instructions that, when executed by one or more processors, cause the one or more processors to perform the steps of:
   calculating, according to a memory access metric, a first value corresponding to an execution of a first virtual machine (VM) of a plurality of VMs, the plurality of VMs are configured to share processing resources of a computing system according to timeslices allocated between the plurality of VMs;
   detecting that the first value exceeds a threshold value;
   determining, based on the first value, an idle time duration for which a first virtual CPU resource assigned to the first VM is placed into an idle state during a first set of the timeslices that are allocated to the first VM, wherein the first virtual CPU resource comprises at least one virtual CPU assigned to the first VM; and
   during execution of code for the first VM, causing the first virtual CPU resource to be placed in the idle state for the idle time duration for at least one timeslice in the first set of the timeslices,
   detecting, after the at least one timeslice, that the first value has decreased;
   reducing the idle time duration for the first VM; and
   causing the first virtual CPU resource to be placed in the idle state for the reduced idle time duration during a subsequent timeslice in the first set of the timeslices that is after the at least one timeslice.

* * * * *